No. 646,498. Patented Apr. 3, 1900.
J. LECIEJEWSKI.
TAILOR'S MEASURING DEVICE.
(Application filed Oct. 12, 1899.)

(No Model.) 2 Sheets—Sheet 1.

No. 646,498. Patented Apr. 3, 1900.
J. LECIEJEWSKI.
TAILOR'S MEASURING DEVICE.
(Application filed Oct. 12, 1899.)
(No Model.) 2 Sheets—Sheet 2.

UNITED STATES PATENT OFFICE.

JOHANN LECIEJEWSKI, OF POSEN, GERMANY.

TAILOR'S MEASURING DEVICE.

SPECIFICATION forming part of Letters Patent No. 646,498, dated April 3, 1900.

Application filed October 12, 1899. Serial No. 733,536. (No model.)

*To all whom it may concern:*

Be it known that I, JOHANN LECIEJEWSKI, a subject of the King of Prussia, Emperor of Germany, residing at Rawitsch, in Posen, in the Kingdom of Prussia and German Empire, have invented certain new and useful Improvements in Measuring Devices for the Human Body, (for which I have applied for a patent in Germany, dated March 10, 1899,) of which the following is a specification.

This invention relates to a device for obtaining the principal measurements of the trunk of the human body. With its assistance the principal measurements of the body for tailoring purposes can be taken, and it can likewise be ascertained whether any given person has a normal figure and eventually how far the figure differs from a normal one. The principal measurements and the figure are both determined from about the middle of the length of the trunk in both directions at the same time.

Figure 1:
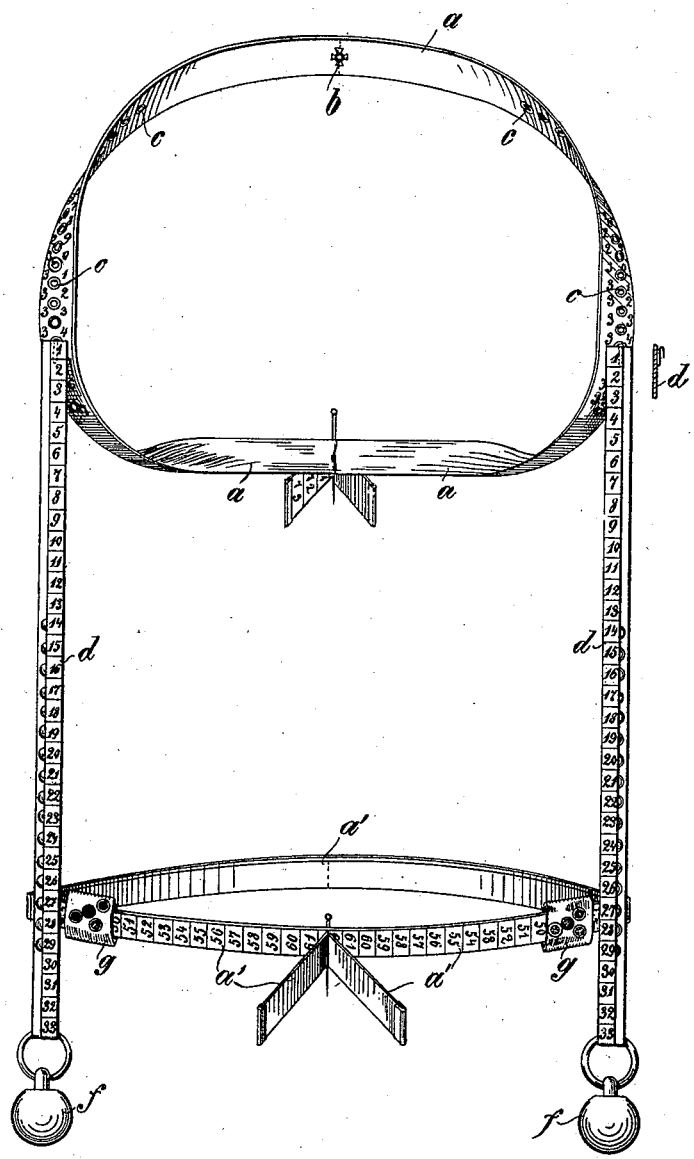
Figure 2:
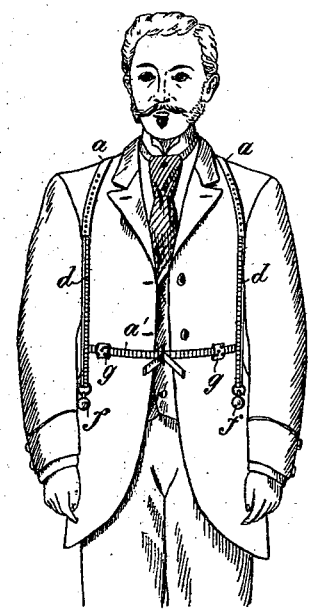
Figure 3:
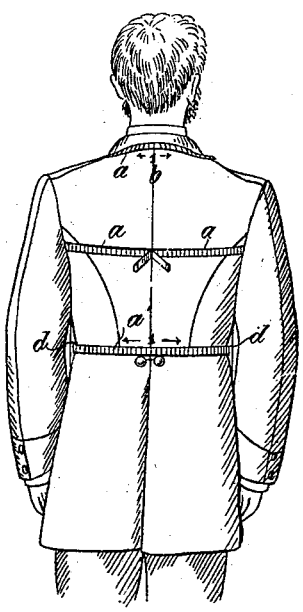
Figure 6:
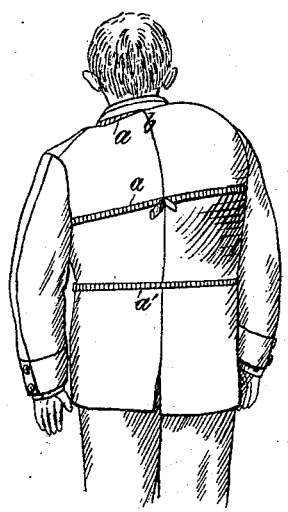
Figure 4:
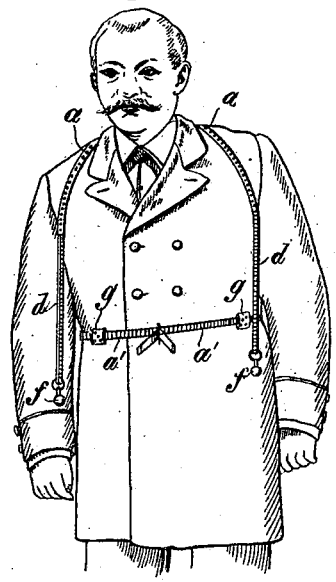
Figure 5:
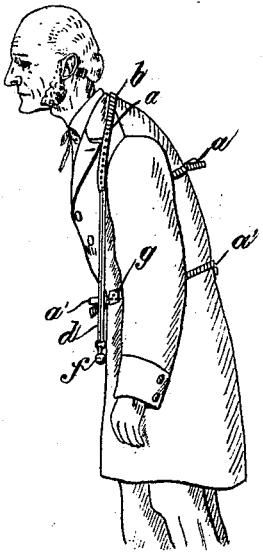

In the accompanying drawings, illustrating this invention, Figure 1 represents the device in perspective in the position it takes on the body. Figs. 2 and 3 show the application of the device for the purpose of taking the principal measurements of a normal figure, and Figs. 4, 5, and 6 show the use of the device for the purpose of ascertaining to what degree certain deformed figures differ from a normal one.

The device, as will be seen from Fig. 1, consists, first, of a measuring tape or band $a$, on which the "0" point is at the middle of its length and the centimeter or other divisions rise toward each end. At suitable points in the band holes $c$ are provided, that are strengthened by metal rings.

The device consists, secondly, of a second band $a'$, on which, as on the band $a$, the "0" point is marked at the middle point and the centimeter-divisions rise toward each end. On each end of this band $a'$ is a slide $g$, that is provided with a number of buttons.

The device consists, further, of two measuring-bands $d$, each provided with a hook at the top end and with centimeter-divisions increasing toward the lower ends. To the lower end of each of these bands a weight is secured by a ring or other contrivance.

In order to obtain the principal measurements with this device, the band $a$ is so placed around the shoulders that the "0" point $b$, Fig. 3, coincides with the cervical vertebra, and the two ends are passed under the arms and across the back, so as to meet each other, and are secured together by suitable means, as shown in Fig. 3. With the assistance of the band placed around the body in this manner it is easy to obtain the principal measurements—as, for example, the exact position of the spine, the depth of the arm, the diameter of the arm, and the width of the shoulders. Further, with this band it can be ascertained whether the upper part of the body is symmetrical or not, and, if not, exactly at what point the defect lies. After the first band $a$ is in position the second band $a'$ is placed around the body in the proximity of the thighs in order to obtain the measurements of the waist. By hooking the bands $d$ in corresponding holes $c$ of the band $a$ they will take a perpendicular position in consequence of the weights $f$ and show on the band $a$ whether, and if so to what degree, the body is inclined to the right or left, Fig. 4. Further, by the position of the perpendicular bands it can likewise be seen whether the body is bent backward or forward, Fig. 5. The slides $g$ are moved along the band $a'$ so as to coincide with the division crossed by the perpendicular bands $d$ and secured in position by pressing the buttons into the corresponding holes of the bands $d$.

It will be evident without explanation that the height of the waist and many other measurements can be taken with this device.

What I claim, and desire to secure by Letters Patent of the United States, is—

1. In a measuring device, the combination with the band $a$ having peripherally-disposed holes, the band $a'$ provided with measuring-divisions, and the bands $d$ having hooks to engage the holes in band $a$ and weighted free ends, substantially as described.

2. In a measuring device, the combination with the band $a$ and bands $d$ provided with means for detachably securing them to said band $a$, and the band $a'$ provided with measuring-divisions and slides $g$, substantially as described.

3. A measuring device, especially suitable for measuring deformed human figures, consisting of two measuring-bands $a$, $a'$, having the "0" point at the middle of their length, of which the one $a$ is placed over the shoulders, under the arms and across the back, where the ends are secured together, giving the principal measurements of this part of the body, and the other $a'$ is placed around the body in the proximity of the thighs, giving the measurements of the waist; and of two measuring-bands $d$, to the lower ends of which weights $f$ are attached and having hooks at their upper ends that can be hooked into holes provided in the band $a$ so that the defects of the body can be measured by the relative position of the perpendicular band $d$ and band $a'$, substantially as described.

In testimony whereof I have hereunto set my hand in the presence of two witnesses.

JOHANN LECIEJEWSKI.

Witnesses:
CARL WEBER,
HERMANN BARTSCH.